US007991892B2

(12) United States Patent
Hamilton, II et al.

(10) Patent No.: US 7,991,892 B2
(45) Date of Patent: Aug. 2, 2011

(54) COMPARATIVE EFFICIENCY DECISIONS IN PRINT OPERATIONS

(75) Inventors: Rick A. Hamilton, II, Charlottesville, VA (US); Brian M. O'Connell, Cary, NC (US); Clifford A. Pickover, Yorktown Heights, NY (US); Victoria L. Vogelsang, Milton, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 12/120,315

(22) Filed: May 14, 2008

(65) Prior Publication Data

US 2009/0287806 A1    Nov. 19, 2009

(51) Int. Cl.
G06F 15/16    (2006.01)
G06F 15/173   (2006.01)

(52) U.S. Cl. ........ 709/226; 709/217; 709/218; 709/223; 709/224; 709/225

(58) Field of Classification Search .................. None
See application file for complete search history.

(56) References Cited

U.S. PATENT DOCUMENTS

| | | | | |
|---|---|---|---|---|
| 5,914,737 A * | 6/1999 | Silverbrook | | 347/48 |
| 5,987,225 A * | 11/1999 | Okano | | 358/1.13 |
| 6,268,925 B1 * | 7/2001 | Yamanaka | | 358/1.14 |
| 6,678,068 B1 * | 1/2004 | Richter et al. | | 358/1.15 |
| 6,775,729 B1 * | 8/2004 | Matsuo et al. | | 710/263 |
| 7,143,210 B2 * | 11/2006 | Ferlitsch | | 710/38 |
| 7,256,902 B1 | 8/2007 | Morikawa et al. | | |
| 7,258,498 B2 * | 8/2007 | Hatta et al. | | 400/62 |
| RE39,808 E | 9/2007 | Motegi | | |
| 7,333,228 B2 | 2/2008 | Yang et al. | | |
| 7,339,688 B1 | 3/2008 | Baba et al. | | |
| 7,400,424 B2 * | 7/2008 | Parry | | 358/1.15 |
| 7,444,088 B2 * | 10/2008 | Radulski et al. | | 399/27 |
| 7,576,883 B2 * | 8/2009 | Ragnet et al. | | 358/1.15 |
| 7,729,633 B2 * | 6/2010 | Bildstein et al. | | 399/91 |
| 7,853,160 B2 * | 12/2010 | Koitabashi | | 399/24 |
| 2005/0099438 A1 * | 5/2005 | Lester et al. | | 347/4 |
| 2008/0007775 A1 * | 1/2008 | Mizobuchi et al. | | 358/1.15 |
| 2008/0240829 A1 * | 10/2008 | Miyazaki et al. | | 400/76 |
| 2008/0266592 A1 * | 10/2008 | Brougham et al. | | 358/1.15 |
| 2009/0125910 A1 * | 5/2009 | Lazarus | | 718/104 |

FOREIGN PATENT DOCUMENTS

JP    2000339115 A   * 12/2000
WO       03060689      7/2003

* cited by examiner

*Primary Examiner* — Dohm Chankong
*Assistant Examiner* — Angela Widhalm
(74) *Attorney, Agent, or Firm* — Patrick J. Daugherty; Driggs, Hogg, Daugherty & Del Zoppo Co., LPA

(57) ABSTRACT

Methods, devices, services and program products are provided for selecting a printer from a plurality of printers as a function of a printer resource consumption attribute where there is a network environment comprising a plurality of printers, each of the plurality of printers having a resource consumption attribute value. A user invokes a print operation through the network environment and a processing means compares weighted resource consumption attribute values for each of the plurality of printers. Processing means automatically select at least one destination printer from the plurality of printers having a lower resource usage requirement for performing a print operation relative to at least one unselected printer of the plurality of printers. Processing means also automatically choose a destination printer as a function of an availability of each of the destination printers.

15 Claims, 3 Drawing Sheets

COMPARATIVE EFFICIENCY DECISIONS IN PRINT OPERATIONS

FIELD OF THE INVENTION

The present invention generally describes means for selecting a printer from a plurality of destination printers based on the energy and resource consumption attributes of the destination printers.

BACKGROUND OF THE INVENTION

Green computing is sometimes defined as the study and practice of using computing resources efficiently. Typically, technological systems or computing products that incorporate green computing principles take into account economic viability, social responsibility, and environmental impact. One major goal of green computing as applied to printing apparatuses is to create smaller carbon footprints, allowing the least amount of greenhouse gases to be produced and released into the environment from printing operations.

Various types of printers are widely used in offices and homes around the world and they have become standard indoor electronic equipment. Toner-based printers, like laser printers, are commonly used. These printers work by using precision lasers to adhere toner to a light-sensitive print drum, then using static electricity to transfer the toner to the printing medium to which it is fused with heat and pressure. Laser printers are known for high quality prints, good print speed, and low cost. Toner, though, contains a large number of volatile and semi-volatile organics.

Additionally, solid ink printers are also commonly used. In some formats, a printhead sprays ink from solid-colored ink sticks onto a rotating, oil coated drum. The paper then passes over the print drum, and the image is transfixed, to the page. Solid ink printers are excellent at printing on transparencies and other non-porous media. Acquisition and operating costs are similar to laser printers, but these printers have high power consumption rates, particle emissions, and long initialization periods.

Inkjet printers, on the other hand, have a much smaller carbon footprint. These printers consist of nozzles that produce very small ink bubbles that turn into tiny droplets of ink. The dots formed are the size of tiny pixels and are adhered to paper in a liquid form. Ink-jet printers can print high quality text and graphics and are used for both black-and-white and color printing. They also have a much lower initial cost than do laser printers, but have a much higher cost-per-copy, as the ink cartridges need to be frequently replaced. Additionally, inkjets are far slower than laser printers and have the disadvantage that pages must be allowed to dry before being aggressively handled; otherwise, the liquid ink will smear.

No matter the type of printers used, many indoor office environments utilize network printing, a method that enables users in locations geographically separate from each other and from their print devices to produce documents for themselves and others. Print servers enable multiple clients to share one or more print devices and where there are several busy printers and many clients, a central print spool is generally implemented. With a central print spool, print jobs are received from all clients and then dispatched to an available printer. Present print spool configurations commonly look only for available printers; they do not modify printer availability based on the characteristics of the individual printers.

Generally, energy consumption and resource utilization are not optimized when a computer may print to a plurality of printers with varying energy consumption rates, warm up times, paper selections, and other attributes. Without such optimization, energy and resources are wasted.

SUMMARY OF THE INVENTION

Methods, devices, services and program products are provided for selecting a printer from a plurality of printers as a function of a printer resource consumption attribute. Accordingly, methods comprise providing a network environment comprising a plurality of printers, each of the plurality of printers having a resource consumption attribute value; a user invoking a print operation through the network environment; weighting the resource consumption attribute; a processing means comparing weighted resource consumption attribute values of each of the plurality of printers as a function of a context of the print operation invoking; the processing means automatically selecting at least one destination printer from the plurality of printers having a lower resource usage requirement for performing the print operation relative to at least one unselected printer of the plurality of printers as a function of the comparing; and the processing means automatically choosing a destination printer from the at least one destination printer as a function of an availability of each of the at least one destination printers.

Some methods comprise determining each of the plurality of printer consumption resource attribute values by querying each of the plurality of printers for a present value for each attribute; or by querying a database or a service provider for a present value for each attribute. In some methods, determining the availability of each of the at least one destination printers occurs by comparing a number of print jobs contained on a print spool of each of the at least one destination printer to a print queue threshold and choosing the destination printer comprises choosing a destination printer having a print spool number of print jobs not exceeding the print queue threshold.

Methods also comprise comparing weighted resource consumption attribute values by determining a standby power state value or a ready power state value for each of the plurality of printers, and determining an energy required to transition to the ready state for each of the plurality of printers determined to be in the standby state; where choosing the destination printer comprises choosing a one of the at least one destination printer in the ready state, or if not at least one destination printer is in the ready state choosing a one of the at least one destination printer in the standby state having a lower determined transition energy requirement relative to another of the at least one destination printer in the standby state. Methods may also comprise selecting the at least one destination printer comprises selecting at least one printer having a higher toner level relative to a toner level of an unselected printer and selecting at least one printer having a lower air quality impact value associated with performing the print operation relative to an air quality impact value associated with performing the print operation by an unselected printer.

Methods are also provided for weighting and comparing the resource consumption attribute by determining an amount of energy consumed required by each of the plurality of printers to print the print operation as a function of a print operation page length and a printer energy profile; where selecting the at least one destination printer comprises selecting at least one printer having a lower consumed energy amount required to print the print operation relative to a consumed energy amount required by an unselected printer, and selecting at least one printer containing paper with a higher level of recycled content relative to paper contained by an unselected printer. For some methods, selecting the at least one destination printer comprises selecting at least one printer containing a refillable toner cartridge and excluding an unselected printer containing a non-refillable toner cartridge.

Some methods are provided for determining that none of the plurality of printers meet a low energy requirement threshold or a low resource usage requirement threshold for performing the print operation as a function of the comparing; notifying the user that printing of the print operation cannot occur; and the user modifying the low energy requirement threshold or the low resource usage requirement threshold to enable selecting of the at least one destination printer; or the user specifying a printer of the plurality of printers for receiving and printing the print operation. In some methods, a context of the print operation is a print job page length.

In another aspect, methods are provided for deploying an application for selecting a printer from a plurality of printers as a function of a printer resource consumption attribute, for example by a service provider who offers to implement, deploy, and/or perform functions for others. Still further, an article of manufacture comprising a computer usable medium having a computer readable program in said medium may be provided. Such program code comprises instructions which, when executed on a computer system, cause the computer system to perform one or more of the method and/or process elements for selecting a printer from a plurality of printers as a function of a printer resource consumption attribute. Moreover, systems, articles and programmable devices configured for performing one or more of the method and/or process elements of the current invention for selecting a printer from a plurality of printers as a function of a printer resource consumption attribute, for example, as described above, are also provided.

BRIEF DESCRIPTION OF THE DRAWINGS

These and other features of this invention will be more readily understood from the following detailed description of the various aspects of the invention taken in conjunction with the accompanying drawings in which.

Figure 1:
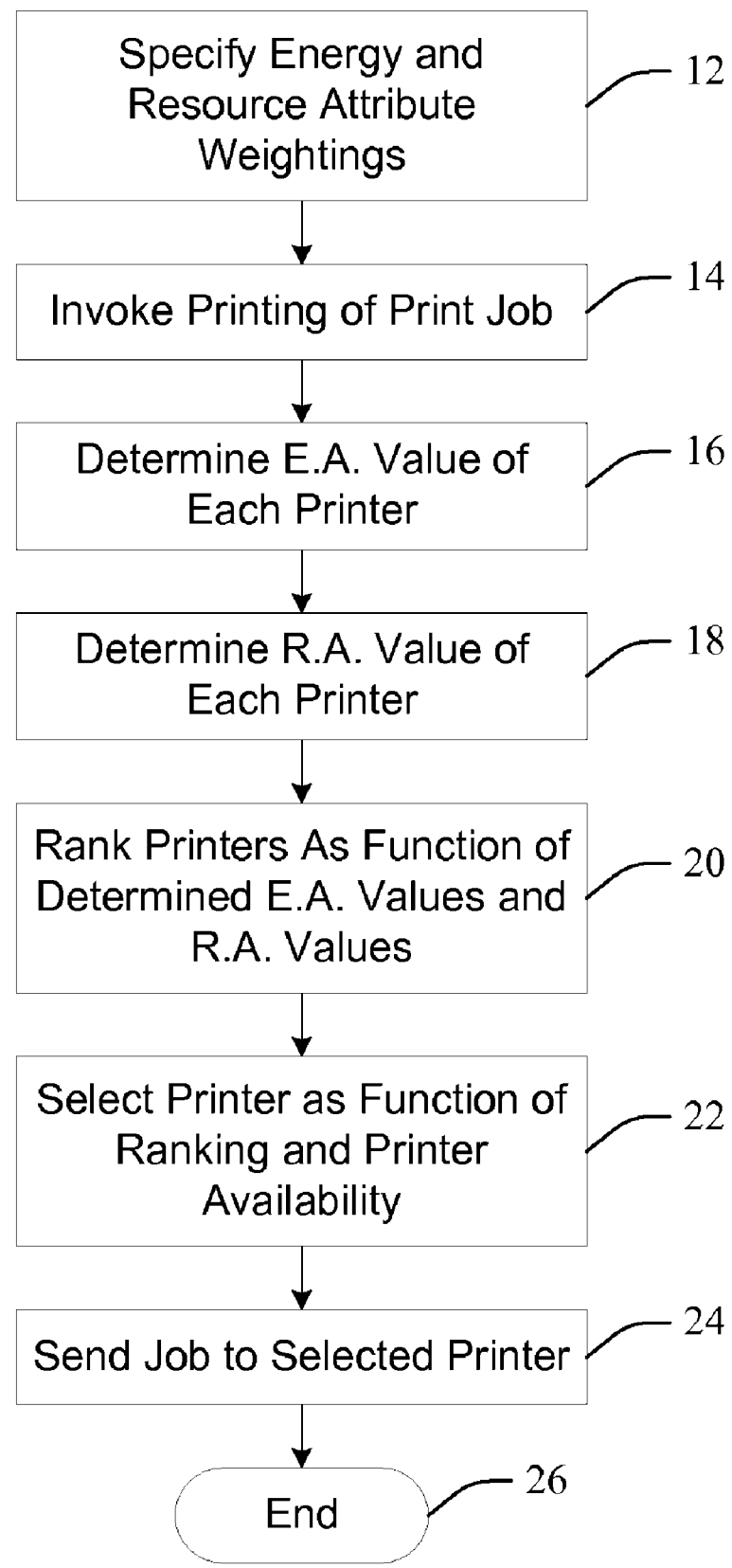
FIG. 1 is a flow chart illustrating a process for selecting a printer from a plurality of destination printers based on the energy and resource consumption attributes of the destination printers.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:

I. General Description
II. Computerized Implementation

I. General Description

Energy and resource reductions may minimize the carbon footprint of a printing apparatus. The reductions described below may occur on a printer individually or may be applied to an entire network printing configuration. While the individual optimizations described in this invention may result in minute energy and resource savings per invocation, the repeated invocation of the described methods potentially result in large energy and resource reduction.

FIG. 1 illustrates a method for selecting a printer from a plurality of destination printers based on the energy and resource consumption attributes of the destination printers. At 12 the user specifies energy and resource attribute weightings. Specifying at 12 may occur through a plurality of apparatuses or software programs. Some embodiments are described more fully below and other examples will be apparent to one skilled in the art, while numerous modifications and substitutions are possible without deviating from the claims of the invention.

Some embodiments of specifying attribute weightings at 12 include finite values being assigned to a printing device. These default weightings may, for example, vary based on the type of device (e.g. toner-based printers or inkjet printers) and may be established by the user, the user's employer or company, a service provider, or by the manufacturer according to government standard or regulation, like Energy Star guidelines provided by the United States Environmental Protection Agency (EPA) or other governmental mandates. An individual creating their own default weightings may also benefit from additional energy and resource savings if implementing the present invention into an existing configuration utilizing other energy and resource conservation methods.

Other embodiments allow the user to reconfigure specified attribute weightings, for example, by selecting a single attribute, a grouping of attributes, or the entire list of attributes, and entering new values or selecting weightings from a displayed list. In further embodiments, the attribute weightings may be specified dynamically by the system. For example, as a printer is used over a period of time the attribute weightings may be higher or lower, in one aspect depending on the existence of external factors, such as rising temperatures surrounding the printer (which may lower energy efficiency, because the device will require more energy to cool the working components).

At 14 the user invokes printing. Some embodiments of invoking at 14 include the user selecting "printing" or "print document," for example, from a dropdown box, by highlighting an icon within the computer desktop or by pressing down a print button on the keyboard which invokes printing for the current application.

Once invoked, the system determines an energy attribute (E.A.) value for each printer at 16. In some embodiments, the energy attribute weighting value may be a function of factors that contribute to the physical operation of the printing device. For example, printers commonly have two operational power states, "ready" state and "standby" state, and when a printer is in the ready state the printer is capable of printing documents with no additional energy expenditure. When in standby state, a printer may still accept requests for printing, but will require a period of time to initialize the printing process. Because this additional wattage is expended, embodiments may weight printers in a standby state differently than printers in the ready state. Some embodiments may also differentiate standby-state weightings: for example, printers that expend the least amount of energy to transition from standby to ready state may receive lower weightings.

Some embodiments compare the initialization and continuing energy usage of printers in the standby state with the current and continuing energy usage of printers in the ready state, then assigning the printers with the lowest, total energy-usage lower attribute weightings; for example, a printer A in standby requires 20 watts to initialize and 100 watts for continued use, and printer B expends 50 watts currently in ready state and 100 watts for continued use. Therefore, in this example printer A is weighted for selection over printer B for less total-energy expenditure.

Embodiments at 16 may also factor in additional components into the definition of the energy attribute weighting: for example, a monthly electricity bill may be entered into the system for parsing based on historical printer usage data, to determine which devices required less wattage for a given month; daily predicted energy usage may also be used in a dynamic system to initially set a weighted attribute before use of a printer. Other embodiments may dynamically define an energy attribute value by aggregating one or more factors, for example including how many times a printer's paper tray is refilled, a percentage of ink or toner used and how many times an ink or toner cartridge has been refilled or replaced because of printing operations. In one aspect, high frequencies of engagement of a given printer during short time periods may be attributed to loss of optimal energy efficiency or excess resource usage in printer allocations, and thus printer-use frequencies may also be used as weighted attributes.

At 18 a resource attribute (R.A.) is determined for each printer. The resource usage attribute may be based on a number of aspects, including, but not limited to: toner or ink level of the printer, the type of toner or ink used, whether or not the ink cartridge used is refillable or disposable only, and paper type. More particularly, laser printers commonly use toner, which when transferred to a blank sheet of paper, creates the document. If the toner level is below a given measure within the cartridge, the output of the print may suffer from poor toner coverage. With poor toner coverage the output may be too light or parts of the page may not receive toner, resulting in illegible output. It is routine for users who receive illegible output to replace the toner cartridge and reprint the document. Such actions result in twice the energy and resource consumption for a specific print operation. As such, a printer with a higher toner level may have a lower weighted resource usage attribute than a printer with a lower toner level.

Toner is a carbon powder blended with a polymer, whose composition may vary, but examples include styrene acrylate copolymer or a polyester resin. This powder is capable of remaining suspended in the air around a printer for an extended period of time. Since toner types may have different qualities, the quantities of particles emitted and the length of time these particles will remain within the air differs. Accordingly, in some examples a printer using a toner with a least amount of emitted particles that remain suspended in the air for the shortest period of time will have a lower weighted resource usage attribute than printers using toners tending to generate larger amounts of emitted particles, or particles that remain in the air for relatively protracted periods of time.

Inkjet printers generally use a complex ink medium that comprises solvents, pigments, dyes, resins, particulate matter, and other materials. Inkjet printers also generally require multiple ink cartridges to create printed documents, and may produce illegible output as a function of low ink medium levels, for example as described above with respect to toner cartridges. Likewise, printers with higher ink levels, or, for example, a higher volume of a required ink color for a particular type of document, may have a lower resource usage attribute value than printers with low ink levels. However, ink jet printers tend to produce fewer particle emissions because the ink medium generally does not generate the fine dust ascribed to toner therefore, available inkjet printers may have a lower resource usage attribute value than a laser or other toner-based printer.

Additional characteristics for both toner and ink cartridges may also be considered in defining the resource attribute at 18. Examples of characteristics include: temperature and humidity surrounding the printing device (for example, high temperatures and humidity may exaggerate condensation within the cartridge, reducing print quality and the useful life of the cartridge); the mechanical operability of the drum or print head employing the cartridge (for example, a decrease in operability may require additional resources to be consumed if illegible outputs occur due to inoperability); and external actions taken on the cartridge (for example shaking or dropping, which may change the composition of material within the cartridge and lead to poor print quality).

Other printer characteristics may also be considered in defining a resource attribute at 18. For example, printers loaded with different types of paper may be weighted differently in some embodiments, as a function of a level of recycled content. For example, one printer may be loaded with paper containing 15% recycled material where another printer contains paper with 50% recycled material. Less energy and resources may be consumed when using paper with more recycled substances, and thus the printer containing the higher level of recycled-content paper may have a lower resource usage attribute than the printer containing paper with a smaller percentage of recycled paper.

At 20, the network printers are ranked as a function of the determined energy attribute (E.A.) values and the resource attribute (R.A.) values. Some embodiments of the ranking at 20 may have printers listed in a database according to a predetermined organization method, assigning energy attribute and resource attribute values accordingly. Other embodiments may populate a database once the energy and resource attributes have been created and apply the weighted attribute values, for example through a rendering algorithm which decomposes the attributes and recombines the individual components into a single weighted attribute which may be catalogued in ascending or descending order for choice of a destination printer.

The printers are also checked for availability at 20. In some embodiments availability is based on the amount of print jobs stored and ready for processing and/or printing within a given print queue for an individual printer or an associated network print spooler. Ordinarily, each time a user invokes a print operation on a network, the operation is placed into a destination printer's queue by the spooler, and from its individual queue the printer executes methods to convert the print operation to a printed document. Queues and spools generally schedule print operations in the order received or in an order based on document priority.

In some embodiments at 22 print jobs may also be balanced between printers based on queue magnitude as well as the printer's energy and resource weighted attributes. For example, a first printer may consume less energy and resources for a selected print operation, however there are 30 documents in that printer's queue. In such a scenario, a second less-preferred printer which consumes more energy and resources may nonetheless be selected as the printer destination because its queue contains two documents, in one aspect to prevent an excessive wait time for the print operation. The print job is then transmitted to the selected printer at 24 and the system ends at 26.

Figure 2:
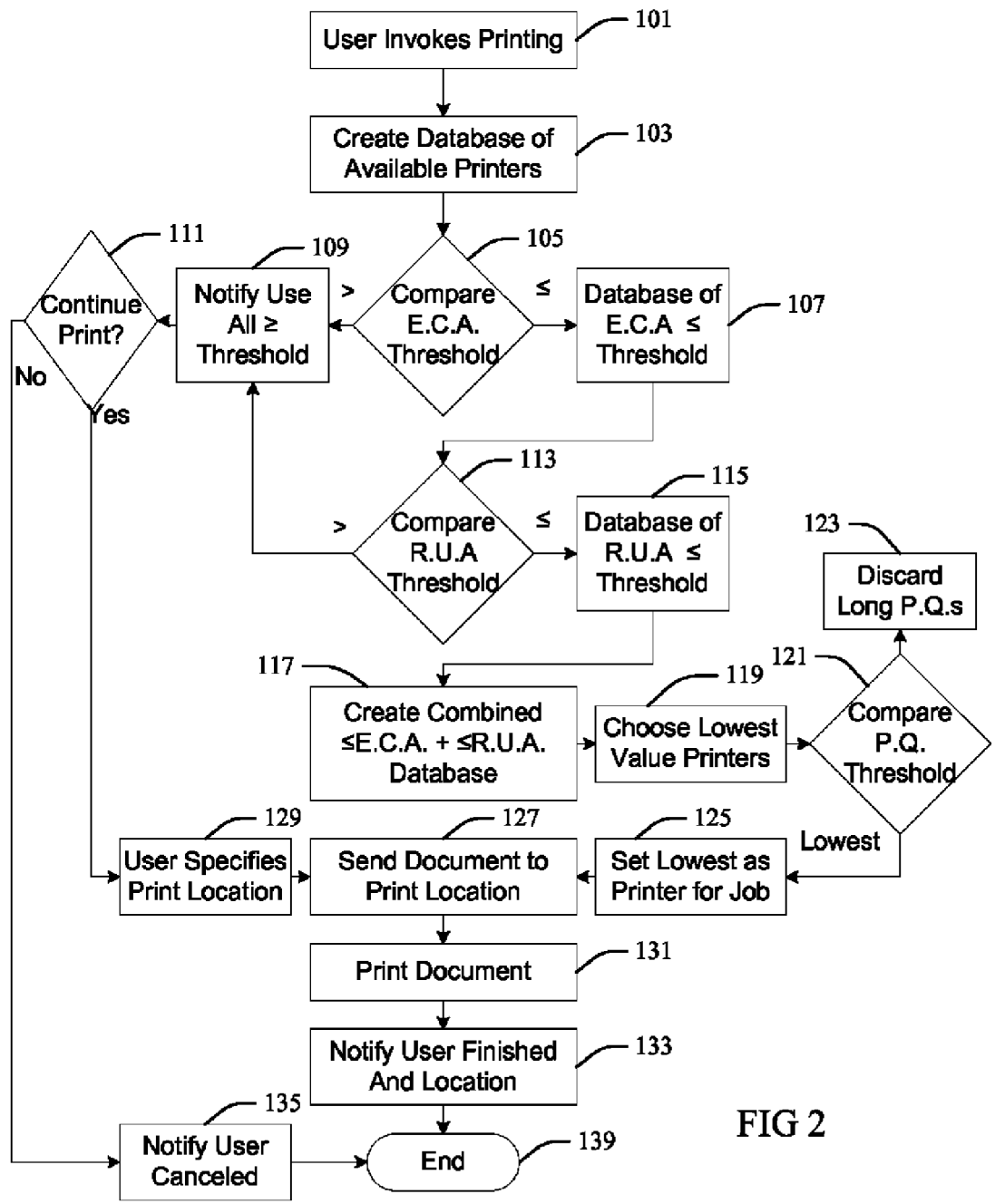
FIG. 2 is a flow chart illustrating a process for selecting a printer from a plurality of destination printers based on the energy and resource consumption attributes of the destination printers

FIG. 2 illustrates an embodiment where the attribute weightings comprise setting one or more threshold values in addition to weightings for each destination printer. At 101 the user invokes printing. Invoking may occur by similar methods to those discussed previously in regards to FIG. 1.

At 103 default threshold parameters are displayed to the user. In one embodiment, the default threshold parameters comprise predetermined, weighted values for: an energy consumption threshold (for example, a function of the lowest amount of energy a destination printer should consume to complete the printing of one document), a resource usage threshold (for example, a function of the smallest quantity of resources a destination printer should use to complete the printing of one document), and a print queue threshold (for example, a function of the lowest number of print jobs that a destination printer should be sent from the network print spool or contain on the printer's spooler at a given time).

Some embodiments of the present invention at 101 include a general user interface (GUI) which allows a user, for example, to select each of the default settings, individually or as a whole, to verify the information contained therein. In some embodiments the user may be prompted to change the default thresholds. The user may choose to enter new values for all of the threshold attributes, a single threshold, or some of the thresholds. Once new values are entered, the user may have the option to cancel these changes and again be prompted to change the default settings or to continue with printing.

An available destinations database is created at 103. In some embodiments, this database may contain ready network printers. For example, when network printers are in the ready state, this attribute may be communicated to the system, whereby these printer locations are assigned to the database at 103. Other embodiments may assign all network printers to the database, regardless of operational power state, but the energy consumption attribute is defined as a function of the ready state availability, for example, printer A is in ready state whereas printer B is in standby. Printer A, therefore, will be assigned a lower weighted value than printer B.

A warm up attribute value and default threshold may be designated in some embodiments. This warm up threshold may be utilized when no printers are found to be available because all existing network printers are in standby state or otherwise suspended. For these embodiments, printers that expend the least amount of energy to reach the ready state will be listed in the database at 103. For example, printer A expends 20 watts to initialize whereas printer B expends 10 watts; in this illustration, printer B will be assigned a lower value over printer A, for less energy expenditure.

Embodiments may also compare the initialization and continuing energy usage of printers in the standby state with the current and continuing energy usage of printers in the ready state and then assigning the printers with the lowest total energy usage to the database; for example, printer A, in standby requires 20 watts to initialize and 100 watts for continued use, printer B also expends 20 watts to initialize but 120 watts for continued use. Therefore, in this model, printer A will be assigned a lower weighted value over printer B.

Using the locations contained in the available destinations database 103, the system compares the weighted energy attributes for each of the printers against one or more energy consumption attribute (E.C.A.) thresholds at 105. An energy consumption attribute threshold may be based on general energy efficiency standards, such as Energy Star ratings, as well as individual printing device energy profiles. More particularly, printers consume different levels of energy based on their printing operations, and this overall usage at differing energy levels is known as the printer's energy profile; this value typically being a function of the printer's energy consumption varying non-linearly based on the document sizes requested for printing. For example, a printer may require 3 watts of energy to print 1 page, but only require 5 watts of energy to print 20 pages. Therefore, an energy consumption threshold may include an average assigned weight for the energy profiles of the printers contained within the network, or they may be determined as a function of a print operation page size.

The comparisons at 105 may also include a case-by-case computation where the attribute value for each destination printer is plugged into a rendering algorithm and a calculation made and recorded. Calculations at 105 may also involve the comparison of groupings of printers with the same or similar attribute value against a default threshold value, in some examples with a single calculation completed and recorded for the grouping.

If none of the available printers have an energy attribute below the energy consumption threshold(s), the user is notified at 109. This notification may enable a user to select one printer for use in some embodiments, by suggesting or identifying one or more preferred printers, for example by showing the weighted energy consumption attributes for a subset of the printers with only a small percentage difference from the energy consumption threshold, thereby enabling a user to select one of the subset printers for use. Other notification embodiments may involve displaying to the user recommended default settings to print at the given juncture or a predicted time in which printing in the current network would meet the current default settings, enabling a user to enter these new values or set a timed printing for the predicted time. The user is then given the opportunity at 111 to continue printing to a specified printer location or to cancel the current print job. If choosing not to continue, the user is notified of the cancellation at 135 and the system will end at 139. This notification display may be similar to notification embodiments discussed previously in FIG. 1.

If at 111 the user chooses to continue with printing despite the unavailability of printers meeting a threshold, the user is prompted to specify a printing location at 129. Specifying a printer may involve, for example, the user choosing from a list populated using printers with energy consumption attributes close to a threshold value. Another example includes the user manually typing in a printer location. In some embodiments at 129 the system may display a listing of weighted energy consumption attributes and allowing the user to select one, the system, for example, displaying network printers that are preferred as a function of this attribute value for the user to select from. Once the user selects a print location at 129, the document is sent to the specified location, at 127. The document is thereafter printed at 131 and the user notified at 133 of the finished document and its location for retrieval.

In one aspect user printer selections may also be overridden as a function of printer energy and resource attribute determinations. For example, if a user manually selects a printer, for example at 22 of FIG. 1 or at 129 of FIG. 2, the selection may be overridden and the job sent to another printer without asking the user for permission or to select among additional printers. For example, if a printer B is within 20 feet of printer A, a print job may simply be printed on printer B if printer B is more energy efficient or contains a higher percentage of recycled paper without requesting permission or intervention of the requesting user, and at 133, the user may thus be notified that the print job was performed on the printer B.

Alternatively, where one or more printers meet an applicable energy consumption threshold at 105, an energy consumption threshold database is created at 107 including a listing of the printers as selected from the available destination printer database. Using the printer locations in this database, the system at 113 compares the weighted resource usage attribute (R.U.A.) of these printers with one or more default resource usage thresholds. Resource usage attribute thresholds may be based on a number of factors as discussed previously with regards to FIG. 1.

For destination printers found with resource usage attributes at or below the resource usage threshold(s), a resource usage threshold database is created at 115. The weighted energy consumption attributes and the weighted resource usage attributes of these printers are then combined at 117. Combining at 117 may include, for example, adding the weighted values, multiplying the values by a factoring variable, or applying the values to a specified algorithm. From this database, the printers with the lowest combined values are chosen, at 119. In some embodiments, this determination at 119 involves choosing a set percentage of printers or a specified number of printers, for example, 10% or 3 printers out of 25.

The system also compares chosen printers against the print queue threshold at 121. In some embodiments, a print queue threshold attribute may be determined as a function of how many print jobs are stored, are ready for processing or are printing, or as a function of a capacity of a centralized server utilized as a spooler.

In some embodiments of the print queue (P.Q.) attribute at 121, the print jobs may be sent to a printer with a least number of print jobs, regardless of energy or resource attributes. The printers with the longest wait times may also be discarded at 123 and a remaining printer set as the destination printer for the given document, at 125. In some embodiments, a user may be given the option to specify which printer he or she would like to use based before the printers are discarded at 123, in some embodiments further ranked, prioritized or sorted as a function of the print queue and other factors (for example, proximity to work space and ease of retrieval), similar to the methods described in regards to FIG. 1. The document is then sent to the print destination at 127, the document printed at 131, and the user notified of the finished print job and the retrieval location at 133. After notification, the system ends at 139.

Figure 3:
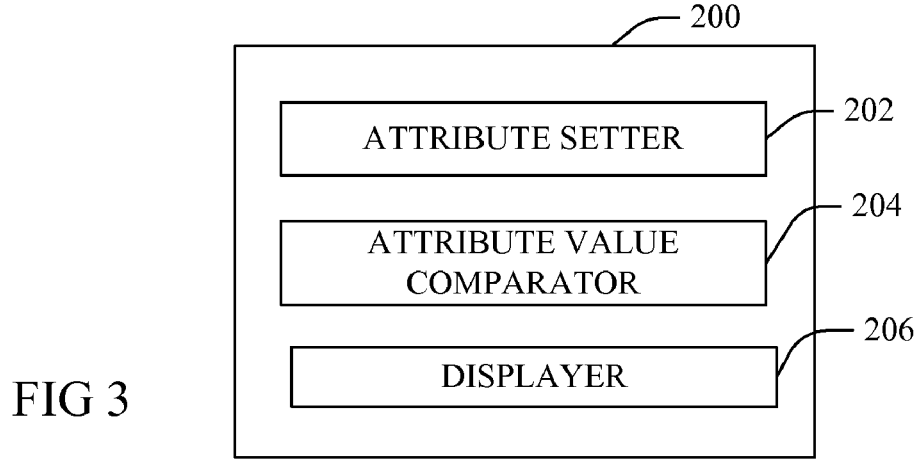
FIG. 3 is a system according to the present invention for selecting a printer from a plurality of destination printers based on the energy and resource consumption attributes of the destination printers.
Figure 4:
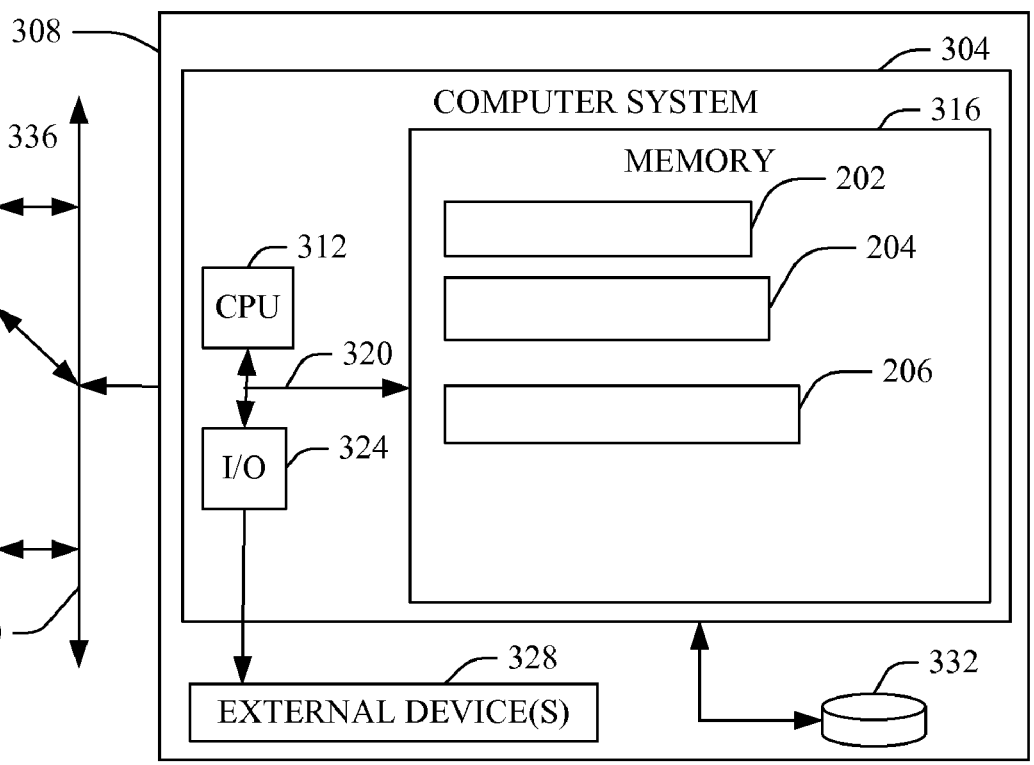
FIG. 4 is a block diagram illustrating an exemplary computerized implementation of a process and system for selecting a printer from a plurality of destination printers based on the energy and resource consumption attributes of the destination printers according to the present invention.

FIG. 3 illustrates a Comparative Efficiency Decider 200 configured to select a printer from a plurality of destination printers based on the energy and resource consumption attributes of the destination printers, for example, as described according to FIGS. 1 and 2.

More particularly, an Attribute Setter 202 sets weighted attribute values for selecting a printer from a plurality of available network printers. The Attribute Setter 202 may assign weighted values through a variety of methods, for example, as a predetermined function of the type of device to be set by the manufacturer or allowing the end-user to enter values or weightings. For some embodiments a system menu may display, for example, allowing the user to select the details and parameters for the existing default thresholds, create new default thresholds, or remove an existing default threshold from use, but reserving it for use at a later time.

Some embodiments of the Attribute Setter 202 may dynamically create weighted attribute values based on the continuously changing elements of the network printing environment as discussed previously with regards to FIGS. 1 and 2.

Embodiments of the Attribute Setter 202 also create databases containing listings of network destination printers and their assigned weighted attributes as a function of printer attribute values. These databases may be compiled as a function of printer proximity to the system invoking the printing process or based on a predetermined order set by the manufacturer, the user, or the employer (this order may allow the user or employer to implement other energy efficiency processes within the networked system without minimizing the aggregate reductions of the embodiments according to the present invention). These created databases are then available for access and addition to by the Attribute Value Comparator 204.

The Attribute Comparator 204 comprises logic components which compare data from the databases determined attribute values and threshold default values, for example, as described with respect to FIGS. 1 and 2.

The Displayer 206 displays notifications to the user. One embodiment may create a dedicated display on a computational device which exhibits all of the available default thresholds that may affect the printing operation process for a given print job. The Displayer 206 may also notify the user when all available printers do not have attribute weightings below the default thresholds, therefore causing, for example, no printers to be available to the user.

Additional embodiments of the Displayer 206 may involve web-based applications that, for example, allow the user to print from any computer application and apply the network printer thresholds to whatever type of document the user has created, for example, a spreadsheet, a series of envelopes or mailing labels, postcards, or presentations.

II. Computerized Implementation

Referring now to FIG. 3, an exemplary computerized implementation includes a computer system 304 deployed within a computer infrastructure 308 such as a computer or a programmable device. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to select a printer from a plurality of destination printers based on the energy and resource consumption attributes of the destination printers as illustrated in FIGS. 1 and 2 and described above, including the Attribute Setter 202, the Attribute Value Comparator 204 and the Displayer 206 components discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement selecting a printer from a plurality of destination printers based on the energy and resource consumption attributes of the destination printers. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure, such as the computer infrastructure 308 that performs the process steps of the invention for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for selecting a printer from a plurality of destination printers based on the energy and resource consumption attributes of the destination printers. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for selecting a printer from a plurality of printers to minimize a carbon footprint of a print operation, the method comprising:
   determining via a programmable processor a resource consumption amount and an energy consumption amount of each of a plurality of network environment printers with respect to an invoked print operation;
   listing a subset plurality of the printers that have determined resource consumption amounts not exceeding a resource amount threshold and that have weighted determined energy consumption amounts not exceeding an energy amount threshold;
   combining the determined resource consumption amounts and the determined energy consumption amounts of the listed subset plurality of the printers into combined amounts;
   automatically choosing a printer with a lowest of the combined amounts as a destination printer for the invoked print operation; and
   wherein the determining the energy consumption amount of each of the printers comprises determining the energy consumption amounts from energy profiles of each of the printers as a function of a print operation page size requested for printing of the invoked print operation, wherein the energy profiles may vary non-linearly based on the print operation page size.

2. The method of claim 1, wherein the determining the energy consumption amount of each of the plurality of network environment printers with respect to the invoked print operation further comprises:
   determining whether each printer is in a ready state or a standby state;
   determining the energy consumption amount as an amount of energy expended in the ready state for each printer in the ready state; and
   determining the energy consumption amount as a sum of an amount of energy expended in the ready state and an amount of an energy required to transition to the ready state from the standby state for each printer in the standby state.

3. The method of claim 1, wherein the determining the resource consumption amount of each of the printers comprises:
   determining the resource consumption amount as a function of an amount of toner particles emitted from the each printer during a print job that remains suspended in the air, and of a period of time that the emitted toner particles remain suspended in the air.

4. The method of claim 1, wherein the automatically choosing the printer with the lowest combined amount as the destination printer for the invoked print operation further comprises:
   determining a number of print jobs contained on a respective print spool of each of the printers; and
   choosing a printer with a lowest combined amount and that also has a number of print jobs not exceeding a print queue threshold as the destination printer for the invoked print operation.

5. The method of claim 4, further comprising:
   determining the number of print jobs as at least one of how many print jobs are stored on a printer, how many print jobs on a printer are ready for processing, how many print jobs on a printer are printing, and a capacity of a centralized server utilized as a spooler.

6. The method of claim 1, wherein the determined energy consumption amount is a printer historic billing amount.

7. A method for selecting a printer from a plurality of printers to minimize a carbon footprint of a print operation, the method comprising:
   determining via a programmable processor a resource consumption amount and an energy consumption amount of each of a plurality of network environment printers with respect to an invoked print operation;
   listing a subset plurality of the printers that have determined resource consumption amounts not exceeding a resource amount threshold and that have weighted determined energy consumption amounts not exceeding an energy amount threshold;
   combining the determined resource consumption amounts and the determined energy consumption amounts of each of the listed subset plurality of printers into combined amounts;
   automatically choosing a printer of the listed subset plurality of printers with a lowest of the combined amounts as a destination printer for the invoked print operation; and
   wherein the determining the resource consumption amount of each of the printers comprises determining the resource consumption amount as a value in inverse proportion to a level of recycled content within paper contained by the each respective printer.

8. A method for selecting a printer from a plurality of printers to minimize a carbon footprint of a print operation, the method comprising:
   determining via a programmable processor a resource consumption amount and an energy consumption amount of each of a plurality of network environment printers with respect to an invoked print operation;
   listing a subset plurality of the printers that have determined resource consumption amounts not exceeding a resource amount threshold and that have weighted determined energy consumption amounts not exceeding an energy amount threshold;
   combining the determined resource consumption amounts and the determined energy consumption amounts of each of the listed subset plurality of printers into combined amounts;
   automatically choosing a printer of the listed subset plurality of printers with a lowest of the combined amounts as a destination printer for the invoked print operation; and
   wherein the determining the resource consumption amount of each of the printers comprises assigning a first resource consumption amount for each printer having a refillable toner cartridge and a second resource consumption amount for each printer having a non-refillable toner cartridge, wherein the first resource consumption amount is lower than the second resource consumption amount.

9. A method for deploying an application for selecting a printer from a plurality of printers to minimize a carbon footprint of a print operation, the method comprising:
   providing a computer infrastructure that:
   determines a resource consumption amount and an energy consumption amount of each of a plurality of network environment printers with respect to an invoked print operation;
   lists a subset plurality of the printers that have determined resource consumption amounts not exceeding a resource amount threshold and that have weighted determined energy consumption amounts not exceeding an energy amount threshold;

combines the determined resource consumption amounts and the determined energy consumption amounts of the listed subset plurality of the printers into combined amounts;

automatically chooses a printer with a lowest of the combined amounts as a destination printer for the invoked print operation; and wherein the computer infrastructure determines the energy consumption amount of each of the printers by determining the energy consumption amounts from energy profiles of each of the printers as a function of a print operation page size requested for printing of the invoked print operation, wherein the energy profiles may vary non-linearly based on the print operation page size.

10. The method for deploying the application of claim 9, wherein the computer infrastructure determines the energy consumption amount of each of the plurality of network environment printers with respect to the invoked print operation by:

determining whether each printer is in a ready state or a standby state;

determining the energy consumption amount as an amount of energy expended in the ready state for each printer in the ready state; and determining the energy consumption amount as a sum of an amount of energy expended in the ready state and an amount of an energy required to transition to the ready state from the standby state for each printer in the standby state.

11. An article of manufacture for selecting a printer from a plurality of printers as a function of resource and energy consumption, the article of manufacture comprising:

a computer readable storage medium device having computer readable program code embodied therewith, the computer readable program code comprising instructions that, when executed by a computer processor, cause the computer processor to:

determine a resource consumption amount and an energy consumption amount of each of a plurality of network environment printers with respect to an invoked print operation;

list a subset plurality of the printers that have determined resource consumption amounts not exceeding a resource amount threshold and that have weighted determined energy consumption amounts not exceeding an energy amount threshold;

combine the determined resource consumption amounts and the determined energy consumption amounts of the listed subset plurality of the printers into combined amounts; and automatically choose a printer with a lowest of the combined amounts as a destination printer for the invoked print operation; and wherein the computer readable program code, when executed by the computer processor, causes the computer processor to determine the energy consumption amount of each of the printers by determining the energy consumption amounts from energy profiles of each of the printers as a function of a print operation page size requested for printing of the invoked print operation, wherein the energy profiles may vary non-linearly based on the print operation page size.

12. The article of manufacture of claim 11, wherein the computer readable program code, when executed by the computer processor, causes the computer processor to determine the energy consumption amount of each of the plurality of network environment printers with respect to the invoked print operation by:

determining whether each printer is in a ready state or a standby state;

determining the energy consumption amount as an amount of energy expended in the ready state for each printer in the ready state; and determining the energy consumption amount as a sum of an amount of energy expended in the ready state and an amount of an energy required to transition to the ready state from the standby state for each printer in the standby state.

13. The article of manufacture of claim 11, wherein the computer readable program code, when executed by the computer processor, causes the computer processor to determine the resource consumption amount of each of the printers by:

determining the resource consumption amount as a function of an amount of toner particles emitted from the each printer during a print job that remains suspended in the air, and of a period of time that the emitted toner particles remain suspended in the air.

14. A programmable device for selecting a printer from a plurality of printers as a function of resource and energy consumption, the programmable device comprising:

a processor;

a memory in communication with the processor; and a network interface in communication with the processor and the memory;

wherein the processor:

determines a resource consumption amount and an energy consumption amount of each of a plurality of network environment printers with respect to an invoked print operation;

lists a subset plurality of the printers that have determined resource consumption amounts not exceeding a resource amount threshold and that have weighted determined energy consumption amounts not exceeding an energy amount threshold;

combines the determined resource consumption amounts and the determined energy consumption amounts of the listed subset plurality of the printers into combined amounts;

automatically chooses a printer with a lowest of the combined amounts as a destination printer for the invoked print operation; and wherein the processor determines the energy consumption amount of each of the printers by determining the energy consumption amounts from energy profiles of each of the printers as a function of a print operation page size requested for printing of the invoked print operation, wherein the energy profiles may vary non-linearly based on the print operation page size.

15. The programmable device of claim 14, wherein the processor determines the energy consumption amount of each of the plurality of network environment printers with respect to the invoked print operation by:

determining whether each printer is in a ready state or a standby state;

determining the energy consumption amount as an amount of energy expended in the ready state for each printer in the ready state; and determining the energy consumption amount as a sum of an amount of energy expended in the ready state and an amount of an energy required to transition to the ready state from the standby state for each printer in the standby state.

* * * * *